Oct. 7, 1969  J. F. BLOEMENDAAL ET AL  3,470,808
PHOTOGRAPHIC SHUTTER OPERATING MEANS
Filed July 21, 1967
2 Sheets-Sheet 1

JOHN F. BLOEMENDAAL
RALPH E. KLAUSS
INVENTORS

BY James J. Wood
Robert W. Hampton
ATTORNEYS

Oct. 7, 1969   J. F. BLOEMENDAAL ET AL   3,470,808
PHOTOGRAPHIC SHUTTER OPERATING MEANS
Filed July 21, 1967   2 Sheets-Sheet 2

JOHN F. BLOEMENDAAL
RALPH E. KLAUSS
INVENTORS

BY *James J. Wood*

*Robert W Hampton*
ATTORNEYS

United States Patent Office 3,470,808
Patented Oct. 7, 1969

3,470,808
PHOTOGRAPHIC SHUTTER OPERATING MEANS
John F. Bloemendaal, Rochester, and Ralph E. Klauss, Webster, N.Y., assignors to Eastman Kodak Company, Rochester, N.Y., a corporation of New Jersey
Filed July 21, 1967, Ser. No. 655,047
Int. Cl. G03b 9/10
U.S. Cl. 95—59      12 Claims

ABSTRACT OF THE DISCLOSURE

A photographic shutter apparatus in which a pivotally mounted shutter is movable in an arcuate path between opened and closed positions. The shutter is fixedly held in each respective position by a latch. Solenoids are provided for each position. The actuation of the solenoid in either the closed or opened position of the shutter pivots a crossbar member to initially compress a restraining spring of the other position. After the spring is compressed, the latch is released and the shutter is then urged by the compressed spring into the other position. A complementary latch, restraining spring and solenoid may be operated to return the shutter to the opposite position.

BACKGROUND OF THE INVENTION

Field of the invention

This invention relates to high-speed photographic printing, but can be adopted for any similar dark or filter shutter application.

Description of prior art

In the usual photographic printing operation, it is known that the slow opening and slow closing of the light aperture causes a variation of the light across the exposure field, thus adversely affecting the positive print. Effort has therefore been directed toward techniques for securing more equal exposure to the printing light.

SUMMARY OF THE INVENTION

The instant invention relates to a high-speed photographic shutter operating means in which a cross beam member cooperates with electromagnetic means so as to be displaced about a pivot to compress spring means. The energy of the compressed spring is then released by latching means, the release of the energy of the compressed spring means serving to quickly displace the shutter means in an arcuate path from the closed to opened position and conversely. In this manner the inertia of the shutter means is largely overcome, so that the shutter means may be moved to the opened or closed position in a time interval in the order of 10 to 15 milliseconds; this time is small compared with printing time, which may vary in the order from 200 milliseconds to fully one second.

Accordingly, it is an object of this invention to provide a photographic shutter operating means in which the closing and unclosing of the light aperture may be accomplished in a time interval which is extremely short as compared with the time necessary for printing.

The novel features which are believed to be characteristic of the invention are set forth with particularity in the appended claims. The invention itself, however, both as to its organization and method of operation, together with further objects and advantages thereof, may best be understood by reference to the following description considered in connection with the accompanying drawings.

BACKGROUND

Figure 4:
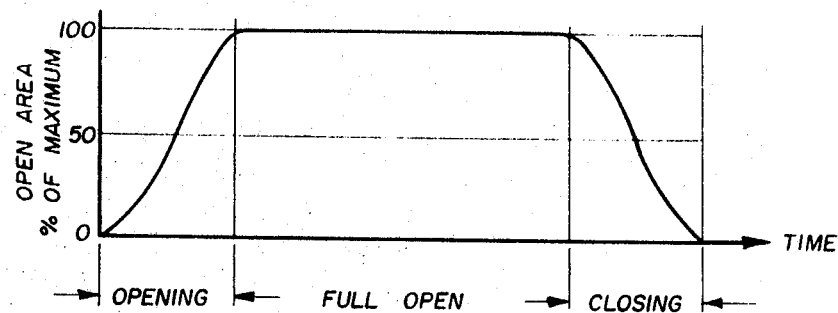
FIG. 4 is a graphical representation depicting the relationship of photographic shutter exposure vs. time.

Before beginning the description of the invention proper, reference will be had to FIG. 4, which depicts the relationship between the area of photograpic shutter exposure vs. time. As will be observed, the curve of instantaneous open area as a percentage of maximum (full open), is relatively slow rising on opening and relatively slow descending on closing of the shutter. In photographic printing it would be ideal to have the opening and closing occur in zero or substantially zero time, so that the relationship shown in FIG. 4 would appear as a rectangle; exposure would therefore be equal everywhere in the printing field. To the extent that does not occur in practice, the printing paper is unequally exposed with deleterious effect on the resulting positive print, the phenomena being known in the art as wedging. (The curve of FIG. 4 roughly corresponds to a trapezoid or wedge.) A certain amount of wedging has been tolerable, but as the lenses and the printing papers have become faster and faster, opening and closing becomes an appreciable parameter. The photographic shutter operating means of this invention enables opening and closing to be effected in the order of 10 to 15 milliseconds, which is small compared with printing times in the order of 200 milliseconds. In the practice of the instant invention, the variation in light across the exposed field will therefore be small, so that the wedging effect is substantially minimized, thus keeping pace with the faster printing papers being introduced in modern photography.

DESCRIPTION OF THE PREFERRED EMBODIMENTS

Figure 1:
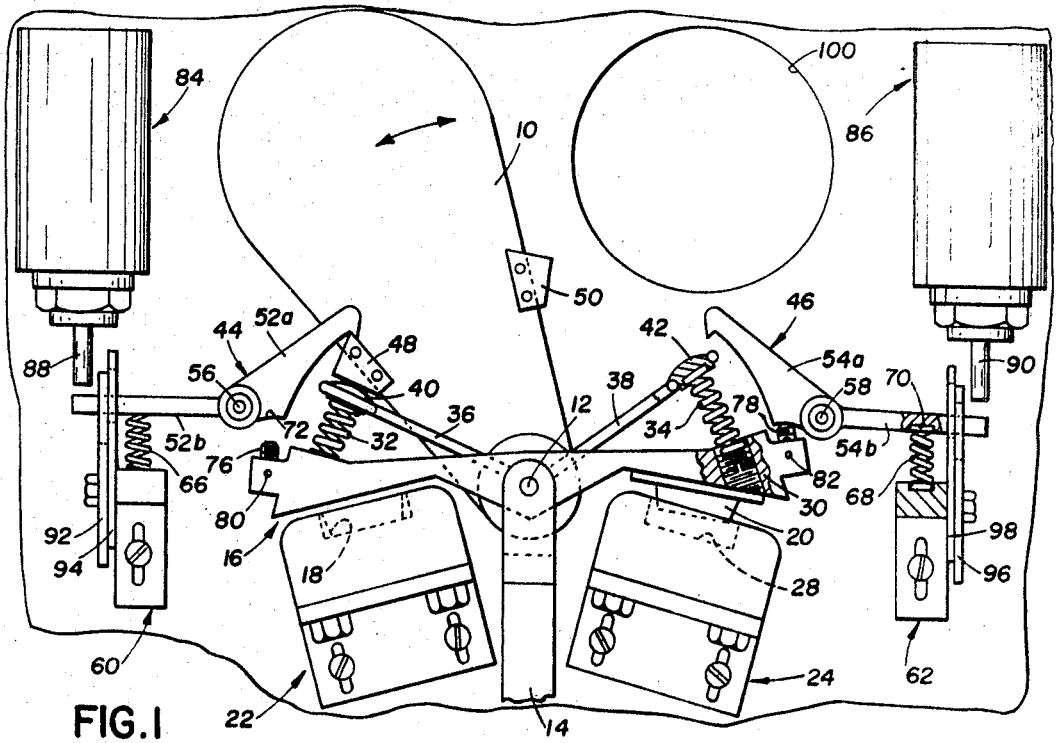
FIG. 1 is a pictorial schematic showing the photographic shutter operating means in the opened position in accordance with the invention.
Figure 2:
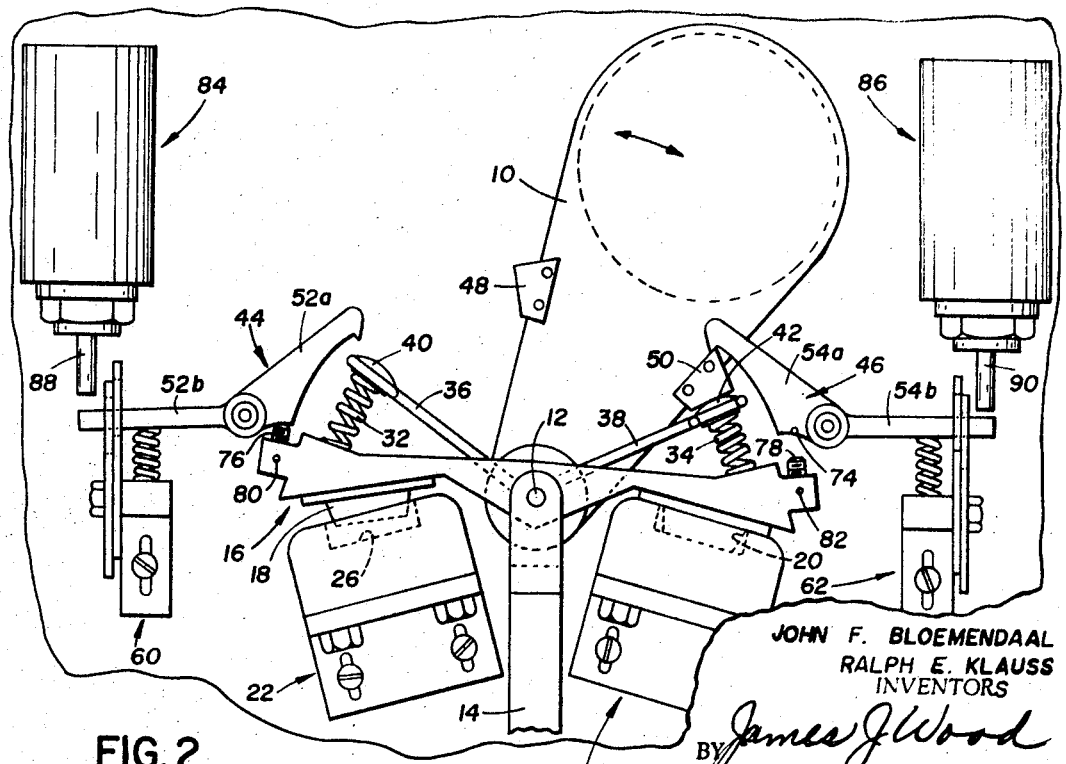
FIG. 2 is a pictorial schematic showing the photographic shutter operating means in the closed position in accordance with the invention.

In FIGS. 1 and 2, a shutter means indicated at 10 is arranged to be pivoted about a shaft 12, suitably journaled in a support 14. Mounted coaxially with the shutter means 10 is a crossbar member or beam, indicated generally at 16, having mounted thereon elements 18, 20, which form the plungers or movable cores for the solenoids indicated generally at 22, 24. The solenoids 22, 24 are suitably recessed at 26 (FIG. 2) and 28 (FIG. 1) to receive plungers 18, 20. (The solenoid coils, electrical connections, etc., are not shown here in the interests of clarity.)

The crossbar member or beam 16 is suitably recessed at each end to provide a well such as indicated at 30, for receiving spring means 32, 34, the other ends of the respective spring means 32, 34 being held in position by restraining members 36, 38, which are provided with caps 40, 42, suitably recessed to receive the ends of the spring means 32, 34 as shown. The restraining members 36, 38 are also pivotally mounted on the shaft 12.

The latching means indicated generally at 44, 46 includes locking elements 48, 50, fixedly secured to the shutter means 10 in any convenient manner, and may take either one of two possible configurations viz it may comprise the parts 52a, 54a, or it may comprise the parts 52a, 52b; 54a, 54b suitably joined together in any convenient manner. The latching means 44, 46 are arranged to pivot about 56, 58, respectively, and include hooked or arcuate portions (unnumbered) adapted to engage locking element 48, FIG. 1, or locking element 50, FIG. 2, respectively, in mating engagement.

In the configuration 52a, 52b; 54a, 54b, the leg elements 52b, 54b are mounted over supports indicated generally at 60, 62. The supports 60, 62 are suitably recessed such as illustrated at 64 (FIG. 1) to receive spring members 66, 68, the other ends of the springs 66, 68 being positioned in an appropriate recess in the leg elements 52b, 54b such as illustrated at 70 (FIG. 1). The latching means 44, 45 may be provided with shoulders at 72 (FIG. 1), (74, FIG. 2), the purpose of which will presently be apparent.

The cross beam member 16 may also be provided with adjustable projection elements 76, 78, which may advantageously be set screws held in position by pins at 80, 82. The projection elements 76, 78 are adopted to strike the latching elements at the shoulders 72, 74.

For certain additional applications, it may be advantageous to utilize electromagnetic means to unlock the latching means 44, 46. Additional solenoid means indicated generally at 84, 86 include plunger elements 88, 90, arranged in the nonoperating position in spaced relationship with the extension lever means 52b, 54b, respectively, as shown. The supports 60, 62 have mounted thereon plates 92, 94 and 96, 98, suitably apertured as shown to permit the extension lever means 52b, 54b to extend therethrough so as to be positioned in cooperating relationship with the plunger elements 88, 90. The printing aperture is indicated at 100.

Figure 3:
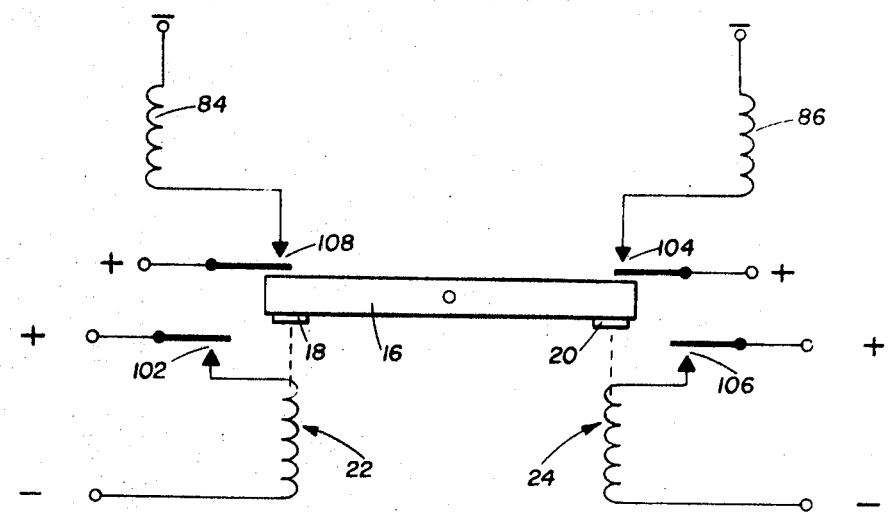
FIG. 3 is an electrical schematic diagram in accordance with the invention.

The solenoids 22, 24, 84, 86 may be operated, if desired, in the electrical configuration diagrammed in FIG. 3. The solenoids 22, 24 may be energized by the closing of the contacts of switches 102, 106, which are arranged in series with the solenoid coils, respectively. Similarly, switches 108, 104 are arranged in series with the coils of solenoids 84, 86, respectively.

OPERATION

The high-speed shutter operating means shown in FIGS. 1 and 2 may be utilized in three different modes of operation.

First, the invention may be practiced using only solenoids 22, 24. Assuming that the shutter means is in the closed position shown in FIG. 2, solenoid 22 is energized, the plunger 18 being drawn into the recess 26, causing cross beam member 16 to be rotated about shaft 12, cocking or compressing spring means 34. As the cross beam member 16 continues to rotate in a counterclockwise direction about 12, the projection element 78 strikes the shoulder 74 of the latching means 46, causing it to pivot about 58, dislodging locking element 50, the released energy of the spring means 34 being exerted against the shutter beam 10, urging it in an arcuate path to the position depicted in FIG. 1. This is the opened position, and as may be seen in FIG. 1, the printing aperture 100 is uncovered. The spring means 32 is now compressed under the discipline of the cross beam member 16, and the cooperating latching means 44.

The light beam now passes uninterrupted through the printing aperture 100. When the exposure time has been completed, the solenoid 24 is actuated, and the plunger 20 is drawn into the recess 28 (FIG. 1), rotating the crossbar member 16 clockwise about the pivot point 12, releasing the latching means 44 by the striking action of the projection element 76 against the shoulder 72 of latching means 44. The shutter blade 10 rotates to the position shown in FIG. 2, covering the aperture 100 so so that no more light can pass through to the printing paper.

In the practical embodiment described herein, the high-speed shutter arrangement covers and uncovers a 2⅛-inch diameter light beam in 10 to 15 milliseconds, and is designed to give an operational life expectancy in excess of two million actuations.

In still other applications, it may be desirable to provide alternate unlocking for the latching means 44, 46, and in this latter arrangement, the high-speed shutter 10 can be operated by means of solenoids 84, 86. In order to open the shutter means 10, the solenoid 86 is activated, the plunger 90 being displaced vertically downward, striking extension lever means 54b, thereby causing latching means 46 to unlock as indicated in FIG. 1, the shutter means 10 moving in an arcuate path and locking in the position indicated in FIG. 1. Similarly, to close the shutter means 10, the solenoid 84 is energized, the plunger 88 being displaced virtually downward so as to unlock latching means 44, the shutter means 10 being then rotated in an arcuate path to the position indicated in FIG. 2.

In still another mode of operation, the photographic shutter operating means of the invention is arranged as shown and described in connection with FIG. 3. In order to open the shutter means 10, the solenoid 22 is actuated by closing switch 102, the action of the plunger 18 causing the crossbar member 16 to be rotated counterclockwise, thereby closing the contacts of switch 104, electrically completing the circuit for the solenoid 86, whereby the plunger 90 then strikes the extension lever means 54b, opening latching means 46.

Similarly, to close the shutter means 10, the switch 106 is actuated to energize solenoid 24, causing cross beam member 16 to be rotated clockwise, thereby closing switch 108, and energizing solenoid 84. The displacement of the plunger 88 vertically downward moves the extension lever means 52b counterclockwise, unlocking latching member 44, the shutter means 10 returning to the closed position shown in FIG. 2. This arrangement possesses the requisite mechanical and electrical inertia, so that solenoids 22, 86 and 24, 84 are sequentially actuated.

Obviously, many modifications and variations of the present invention are possible. In the light of the above teachings, it is therefore to be understood that within the scope of the appended claims, the invention may be practiced other than as specifically described and illustrated.

We claim:

1. Photographic shutter operating means comprising in combination:
   (a) shutter means pivotally mounted and adapted to cover or uncover a printing aperture to define closed and opened positions, respectively;
   (b) latching means for locking the shutter means in said closed and opened positions, respectively;
   (c) a crossbar member pivotally mounted for rotational displacement, having projection members on each end thereof;
   (d) spring means for said closed and opened positions, respectively, adapted to be selectively compressible between said latching means and said crossbar member; and
   (e) electromagnetic means for said closed and opened positions, respectively, adapted upon energization to rotate said crossbar member either clockwise or counterclockwise, whereby the crossbar member initially compresses the proximate spring means until the latching means is dislodged by one of said projection members, the shutter means thereupon being rotated under the discipline of the uncoiling spring means to the closed and opened positions, respectively.

2. Photographic shutter operating means comprising in combination:
   (a) shutter means pivotally mounted and adapted to cover or uncover a printing aperture to define closed and opened positions, respectively;
   (b) latching means for locking the shutter means in said closed and opened positions, respectively;
   (c) restraining means pivotally mounted and adapted to yieldingly press against said latching means;

(d) crossbar member pivotally mounted for rotational displacement, having projection members on each end thereof;
(e) spring means for said closed and opened positions, fixedly secured at one end to said restraining means, and adapted to be selectively compressible between said restraining means and said crossbar member, respectively; and
(f) electromagnetic means for said closed and opened position, respectively, adapted upon energization to rotate said crossbar member either clockwise or counterclockwise, whereby the crossbar member initially compresses the proximate spring means until the latching means is dislodged by one of said projection members, the shutter means thereupon being rotated under the discipline of the uncoiling spring means to the closed and opened positions, respectively.

3. Photographic shutter operating means comprising in combination:
(a) shutter means pivotally mounted and adapted to cover or uncover a printing aperture to define closed and opened positions, respectively;
(b) latching means for locking the shutter means in said closed and opened positions, respectively;
(c) a crossbar member pivotally mounted for rotational displacement, comprising plunger elements and projection members on each end thereof;
(d) spring means for said closed and opened positions, respectively, adapted to be selectively compressible between said latching means and said crossbar member; and
(e) a pair of solenoids for said closed and opened positions, arranged in operative relation with said plunger elements respectively, and adapted upon energization to rotate said crossbar member either clockwise or counterclockwise, whereby the crossbar member initially compresses said spring means until the latching means is dislodged by one of said projection members, whereupon the shutter means is rotated under the discipline of the uncoiling spring means to the closed and opened positions, respectively.

4. Photographic shutter operating means comprising in combination:
(a) shutter means pivotally mounted and adapted to cover or uncover a printing aperture to defined closed and opened positions, respectively;
(b) latching means for locking the shutter means in said closed and opened positions, respectively;
(c) restraining means pivotally mounted and adapted to yieldingly press against said latching means;
(d) a crossbar member pivotally mounted for rotational displacement, comprising plunger elements and including projection members on each end thereof;
(e) spring means for said closed and opened positions, respectively, adapted to be selectively compressible between said restraining means and said crossbar member; and
(f) a pair of solenoids for said closed and opened positions, arranged in operative relation with said plunger elements, respectively, and adapted upon energization, respectively, to rotate said crossbar member either clockwise or counterclockwise, whereby the crossbar member initially compresses the proximate spring means until the latching means is dislodged by one of said projection members, whereupon the shutter means is rotated under the discipline of the uncoiling spring means to the closed and opened positions, respectively.

5. Photographic shutter operating means comprising in combination:
(a) a shutter blade pivotally mounted on a shaft and adapted to cover or uncover a printing aperture to define closed and opened positions, respectively;
(b) latching means, including locking elements fixedly secured to the periphery of said shutter blade, for locking the shutter blade in said closed and opened positions, respectively;
(c) a pair of restraining lever arms rotatably mounted on said shaft and adapted to yieldingly beat against said locking elements;
(d) a crossbar member pivotally mounted on said shaft for rotational displacement, having plunger elements and projections members on each end thereof;
(e) a pair of helical springs for said closed and opened positions, respectively, adapted to be selectively compressible between said restraining lever arms and said crossbar means, respectively; and
(f) a pair of solenoids for said closed and opened positions, arranged in operative relation with said plunger elements respectively, and adapted upon energization to rotate said crossbar member either clockwise or counterclockwise, whereby the crossbar member initially compresses one of said helical springs until the cooperating latching means is dislodged by the proximate projection member, whereupon the shutter blade is rotated under the discipline of the uncoiling helical spring to the closed and opened positions, respectively.

6. Photographic shutter operating means comprising in combination:
(a) shutter means pivotally mounted and adapted to cover or uncover a printing aperture to define closed and opened positions, respectively;
(b) latching means pivotally mounted for locking the shutter means in said closed and opened positions, respectively, including extension lever means;
(c) a crossbar member pivotally mounted for rotational displacement;
(d) spring means for said closed and opened positions, respectively, adapted to be successively compressible between said latching means and said crossbar member; and
(e) electromagnetic means for said closed and opened positions, respectively, adapted upon energization to rotate said extension lever means either clockwise or counterclockwise, whereby the latching means is dislodged, the shutter means thereupon being rotated under the discipline of the uncoiling spring means to the closed and opened positions, respectively.

7. Photographic shutter operating means comprising in combination:
(a) shutter means pivotally mounted and adapted to cover or uncover a printing aperture to define closed and opened positions, respectively;
(b) latching means pivotally mounted for locking the shutter means in said closed and opened positions, respectively, including extension lever means;
(c) restraining means pivotally mounted and adapted to yieldingly bear against said latching means;
(d) crossbar member pivotally mounted for rotational displacement;
(e) spring means for said closed and opened positions, adapted to be successively compressible between said restraining means and said crossbar member, respectively; and
(f) electromagnetic means for said closed and opened positions, respectively, adapted upon energization to rotate said extension lever means either clockwise or counterclockwise, whereby the proximate latching means is dislodged, the shutter means thereupon being rotated under the discipline of the uncoiling spring means to the closed and opened positions, respectively.

8. Photographic shutter operating means comprising in combination:
(a) shutter means pivotally mounted and adapted to cover or uncover a printing aperture to define closed and opened positions, respectively;

(b) latching means for locking the shutter means in said closed and opened positions, respectively, including extension lever means;

(c) a crossbar member pivotally mounted for rotational displacement;

(d) spring means for said closed and opened positions, respectively, adapted to be successively compressible between said latching means and said crossbar means; and (e) a pair of solenoids for said closed and opened positions, arranged in operative relation with said extension lever means, respectively, and adapted upon energization to rotate said extension lever means either clockwise or counterclockwise, whereby the proximate latching means is dislodged by one of said solenoids, whereupon the shutter means is rotated under the discipline of the uncoiling spring means to the closed and opened positions, respectively.

9. Photographic shutter operating means comprising in combination:

(a) shutter means pivotally mounted and adapted to cover or uncover a printing aperture to define closed and opened positions, respectively;

(b) latching means for locking the shutter means in said closed and opened positions, respectively, including extension lever means;

(c) restraining means pivotally mounted and adapted to yieldingly press against said latching means;

(d) a crossbar member pivotally mounted for rotational displacement;

(e) spring means for said closed and opened positions, respectively, adapted to be selectively compressible between said restraining means and said crossbar member; and (f) a pair of solenoids for said closed and opened positions, arranged in operative relation with said extension lever means, respectively, and adapted upon energization, respectively, to rotate the proximate extension lever means either clockwise or counterclockwise, whereby the latching means is dislodged, the shutter means being rotated under the discipline of the uncoiling spring means to the closed and opened positions, respectively.

10. Photographic shutter operating means comprising in combination:

(a) a shutter blade pivotally mounted on a shaft and adapted to cover or uncover a printing aperture to define closed and opened positions, respectively;

(b) latching means rotatably mounted on said shaft and comprising locking elements fixedly secured to the periphery of said shutter blade, for locking the shutter blade in said closed and opened positions, respectively, and including extension lever means;

(c) a pair of restraining lever arms rotatably mounted on said shaft and adapted to yieldingly bear against said locking elements in operative condition;

(d) a crossbar member pivotally mounted on said shaft for rotational displacement;

(e) a pair of helical springs for said closed and opened positions, respectively, adapted to be successively compressible between said restraining lever arms and said crossbar member, respectively; and (f) a pair of solenoids for said closed and opened positions, arranged in operative relation with said extension lever means, respectively, and adapted upon energization to rotate said extension lever means either clockwise or counterclockwise, whereby the proximate latching means is dislodged, the shutter blade being rotated under the discipline of the uncoiling helical spring to the closed and opened positions, respectively.

11. Photographic shutter operating means comprising in combination:

(a) shutter means pivotally mounted and adapted to cover or uncover a printing aperture to define closed and opened positions, respectively;

(b) latching means for locking the shutter means in said closed and opened positions, respectively, including extension lever means;

(c) a crossbar member pivotally mounted for rotational displacement, including plunger elements;

(d) spring means for said closed and opened positions, respectively, adapted to be selectively compressible between said latching means and said said crossbar means;

(e) first switching means for said closed position comprising a first solenoid arranged operatively with one of said plunger elements, a pair of contacts adapted to be electrically closed upon rotation of the crossbar member in one direction, and a second solenoid arranged operatively with said extension lever means and adapted to be actuated upon the closing of said pair of contacts, the actuation of said second solenoid displacing the proximate extension lever means to unlock the latching means; and (f) a second switching means for said opened position comprising a third solenoid arranged operatively with the other of said plunger elements, an additional pair of contacts adapted to be electrically closed upon rotation of the crossbar member in the other direction, and a fourth solenoid adapted to be energized upon closing of said additional pair of contacts, the actuation of the said fourth solenoid displacing the proximate extension lever means, whereby upon actuation of the first switching means, the first and second solenoids are energized successively, the shutter means being rapidly displaced to uncover the printing aperture, and upon actuation of said second switching means, the third and fourth solenoids are energized successively, the shutter means being quickly released to close said printing aperture.

12. Photographic shutter operating means comprising in combination:

(a) shutter means pivotally mounted and adapted to cover or uncover a printing aperture to define closed and opened positions, respectively;

(b) latching means for locking the shutter means in said closed and opened positions, including extension lever means;

(c) restraining means pivotally mounted and adapted to press against said latching means;

(d) a crossbar member pivotally mounted for rotational displacement, including plunger elements;

(e) spring means for said closed and opened positions fixedly secured at one end to said restraining means and adapted to be selectively compressible between said restraining means and said crossbar means;

(f) first switching means for said closed position comprising a first solenoid arranged operatively with one of said plunger elements, a pair of contacts adapted to be electrically closed upon rotation of the crossbar member in one direction, and a second solenoid arranged opeartively with said extension lever means and adapted to be actuated upon the closing of said pairs of contacts, the actuation of said second solenoid displacing the proximate extension lever means to unlock the latching means; and (g) a second switching means for said opened position comprising a third solenoid, arranged operatively with the other of said plunger elements, an additional pair of contacts adapted to be electrically closed upon rotation of the crossbar member in the other direction, and a fourth solenoid adapted to be energized upon closing of said additional pair of contacts, the actuation of the said fourth solenoid displacing the proximate lever means, whereby upon actuation of the first switching means, the first and second solenoids are energized successively, the shutter means being rapidly displaced to uncover the printing aperture, and upon actuation of said second switching means, the third and fourth solenoids are energized successively, the shutter means being quickly released to close said printing aperture.

References Cited

UNITED STATES PATENTS

| | | | |
|---|---|---|---|
| 555,986 | 3/1896 | Whitney | 95—59 |
| 2,244,965 | 6/1941 | Roberts | 355—111 |
| 2,583,342 | 1/1952 | Reeves | 355—90 |
| 3,208,365 | 9/1965 | Cooper | 95—53 XR |

FOREIGN PATENTS 254,688  6/1967  Austria.

NORTON ANSHER, Primary Examiner

LEO H. McCORMICK, Jr., Assistant Examiner

U.S. Cl. X.R.

95—53